United States Patent
Ibtehaz et al.

(10) Patent No.: US 12,256,191 B2
(45) Date of Patent: Mar. 18, 2025

(54) ELECTRONIC APPARATUS GENERATING A SOUND OF A PLURALITY OF CHANNELS AND CONTROLLING METHOD THEREOF

(71) Applicant: SAMSUNG ELECTRONICS CO., LTD., Suwon-si (KR)

(72) Inventors: Nabil Ibtehaz, Dacca (BD); Golam Rahman Chowdhury, Dacca (BD); Md Abdullah Al Hadi, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 17/964,818

(22) Filed: Oct. 12, 2022

(65) Prior Publication Data

US 2023/0164482 A1 May 25, 2023

Related U.S. Application Data

(63) Continuation of application No. PCT/KR2022/012729, filed on Aug. 25, 2022.

(30) Foreign Application Priority Data

Nov. 23, 2021 (KR) .................. 10-2021-0162574

(51) Int. Cl.
  *H04R 1/32* (2006.01)
  *G06F 3/16* (2006.01)
  (Continued)

(52) U.S. Cl.
  CPC .............. *H04R 1/326* (2013.01); *G06F 3/16* (2013.01); *G10L 19/00* (2013.01); *H04S 5/00* (2013.01);
  (Continued)

(58) Field of Classification Search
  None
  See application file for complete search history.

(56) References Cited

U.S. PATENT DOCUMENTS 9,621,122 B2  4/2017  Kim et al.
10,178,490 B1  1/2019  Sheaffer et al.
(Continued)

FOREIGN PATENT DOCUMENTS

JP  2014-505420 A  2/2014
KR  10-2012-0130496  12/2012
(Continued)

OTHER PUBLICATIONS

"How do you guys convert your mono signals into stereo?" Reddit, 2017, www.reddit.com/r/AdvancedProduction/comments/5wkirq/how_do_you_guys_convert_your_mono_signals_into/. (Year: 2017).*
(Continued)

*Primary Examiner* — James K Mooney
(74) *Attorney, Agent, or Firm* — Nixon & Vanderhye P.C.

(57) ABSTRACT

An electronic apparatus and/or a controlling method are provided. The electronic apparatus may include a camera for photographing an image, a microphone for receiving an input of a sound of a first channel, and a processor for generating sounds of a plurality of channels based on the input sound, wherein the processor is configured to identify an object and the location of the object from the photographed image, classify the input sound based on an audio source, and allot the sound to the corresponding identified object, copy the classified sound and generate sounds of two channels, adjust characteristics of the generated sounds of two channels based on the audio source allotted to the identified object and the location of the identified object, and mix the sounds of two channels wherein the characteristics
(Continued)

were adjusted according to the audio source and generate a stereo sound of two channels.

9 Claims, 16 Drawing Sheets

(51) Int. Cl.
    *G10L 19/00*     (2013.01)
    *H04S 5/00*     (2006.01)
    *H04S 7/00*     (2006.01)

(52) U.S. Cl.
    CPC ............. *H04S 7/30* (2013.01); *H04S 2400/11* (2013.01); *H04S 2400/15* (2013.01)

(56) References Cited

U.S. PATENT DOCUMENTS

| | | |
|---|---|---|
| 2013/0106997 A1 | 5/2013 | Kim et al. |
| 2013/0272527 A1 | 10/2013 | Oomen et al. |
| 2014/0211969 A1 | 7/2014 | Kim et al. |
| 2017/0188176 A1 | 6/2017 | Jang |
| 2018/0262747 A1 | 9/2018 | Meirlaen |
| 2021/0218878 A1* | 7/2021 | Kim ........................ G06F 3/165 |
| 2021/0329405 A1 | 10/2021 | Eubank et al. |
| 2022/0386061 A1 | 12/2022 | Shi |

FOREIGN PATENT DOCUMENTS

| | | |
|---|---|---|
| KR | 10-2013-0045553 A | 5/2013 |
| KR | 10-2014-0096774 A | 8/2014 |
| KR | 10-2017-0058839 A | 5/2017 |
| KR | 10-2021-0131422 A | 11/2021 |
| WO | WO 2021/197020 A1 | 10/2021 |

OTHER PUBLICATIONS

English machine translation of KR20120130496 (Year: 2012).*
Ross Girshick, "Fast R-CNN", Proceedings of the IEEE international conference on computer vision, 2015, pp. 1440-1448.
Joseph Redmon et al., "You Only Look Once: Unified, Real-Time Object Detection", Proceedings of the IEEE conference on computer vision and pattern recognition, 2016, pp. 779-788, at URL: http://pjreddie.com/yolo/.
Carsten Klein, "Separating mixed signals with Independent Component Analysis", Towards Data Science, Apr. 20, 2019, 10 pp., at URL: https://towardsdatascience.com/separating-mixed-signals-with-independent-component-analysis-38205188f24f.
Jing Zhu et al., "Learning Object-Specific Distance From a Monocular Image", Proceedings of the IEEE International Conference on Computer Vision, 2019, pp. 3839-3848.
Byung-Hak Kim et al., "LumièreNet: Lecture Video Synthesis from Audio", arXiv preprint arXiv:1907.02253, 2019, pp. 1-9.
PCT Search Report dated Dec. 19, 2022 for PCT Application No. PCT/KR2022/012729.
PCT Written Opinion dated Dec. 19, 2022 for PCT Application No. PCT/KR2022/012729.

* cited by examiner

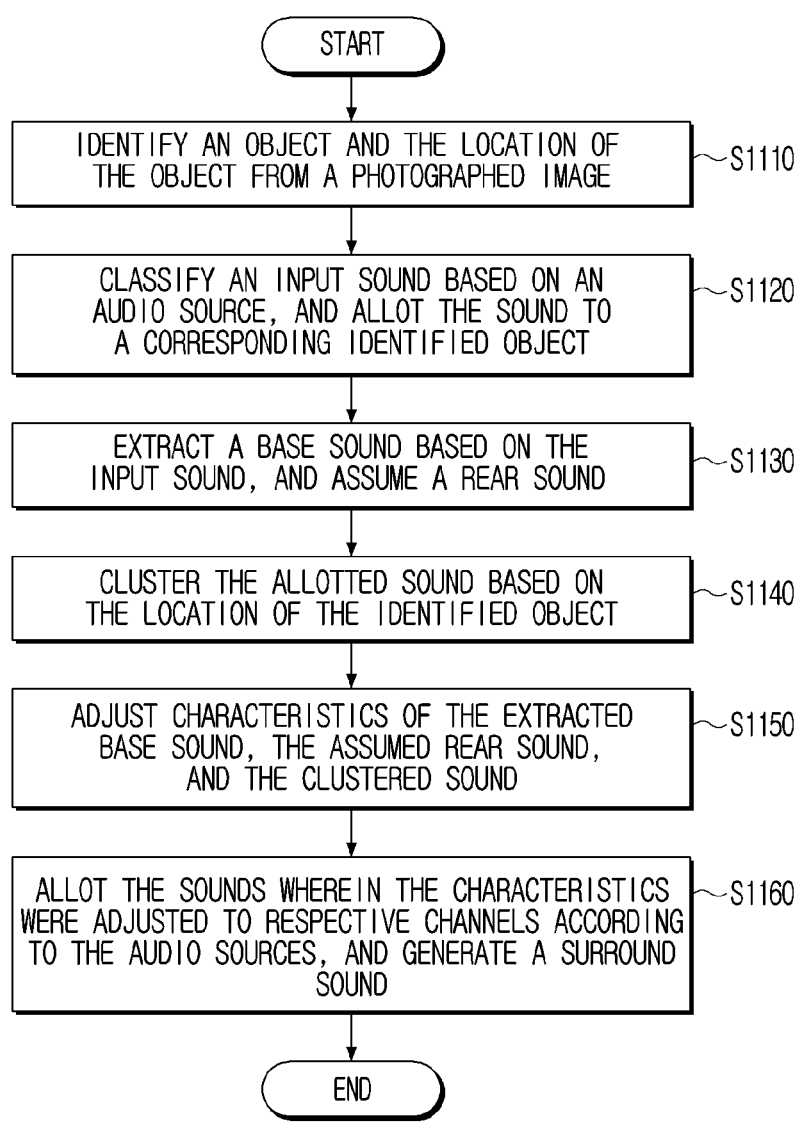

ELECTRONIC APPARATUS GENERATING A SOUND OF A PLURALITY OF CHANNELS AND CONTROLLING METHOD THEREOF

CROSS-REFERENCE TO RELATED APPLICATIONS

This application is a continuation of International Application No. PCT/KR2022/012729 designating the United States, filed on Aug. 25, 2022, in the Korean Intellectual Property Receiving Office and claiming priority to Korean Patent Application No. 10-2021-0162574, filed Nov. 23, 2021, in the Korean Intellectual Property Office, the disclosures of which are incorporated by reference herein in their entireties.

BACKGROUND

1. Field

The disclosure relates to an electronic apparatus and a controlling method thereof, and more particularly, to an electronic apparatus that generates an input sound as sounds of a plurality of channels, and a controlling method thereof.

2. Description of Related Art

As electronic technologies have developed, electronic apparatuses performing various functions are being distributed. For example, in the past, an electronic apparatus output a 4 poly sound, a 16 poly sound, etc., but recently, an electronic apparatus can output a stereo sound and a surround sound. Also, in the past, an electronic apparatus output images of low resolutions such as VGA and XGA, but recently, an electronic apparatus can output images of high resolutions such as Full-HD, Ultra-HD, etc.

Also, as communication technologies have developed, an electronic apparatus can transmit and receive data of a high capacity. Accordingly, it is becoming common that a user uploads or downloads video data including images and sounds of a high performance by using an electronic apparatus.

However, for outputting a sound of a high performance, a plurality of microphones or a surround microphone that can receive inputs of various sounds should be mounted on an electronic apparatus. However, due to the size of a portable electronic apparatus, limitation of a space wherein components are arranged, etc., there is a difficulty in mounting a microphone of a high performance. Also, even if a plurality of microphones are mounted, there is limitation for the plurality of microphones in receiving inputs of sounds having characteristics sufficient for outputting a stereo sound.

Accordingly, there is a need for a technology of generating a stereophonic sound including a plurality of channels by using a microphone that is generally mounted on a portable electronic apparatus.

SUMMARY

The disclosure is for resolving the aforementioned problem, and the purpose of the disclosure is in providing an electronic apparatus that generates a stereophonic sound based on a sound input through a general microphone, and a controlling method thereof.

According to an example embodiment, an electronic apparatus includes a camera for capturing (e.g., photographing) an image, a microphone for receiving an input of a sound of a first channel, and a processor for generating sounds of a plurality of channels based on the input sound, wherein the processor is configured to identify an object and the location of the object from the captured (e.g., photographed) image, classify the input sound based on an audio source, and allot the sound to the corresponding identified object, copy the classified sound and generate sounds of at least two channels, adjust characteristics of the generated sounds of at least two channels based on the audio source allotted to the identified object and the location of the identified object, and mix the sounds of at least two channels wherein the characteristics were adjusted according to the audio source and generate a stereo sound of at least two channels.

Alternatively, an electronic apparatus includes a camera photographing an image, a microphone receiving an input of a sound, and a processor generating sounds of a plurality of channels based on the input sound, wherein the processor is configured to identify an object and the location of the object from the photographed image, classify the input sound based on an audio source, and allot the sound to the corresponding identified object, extract a base sound based on the input sound, assume a rear sound, and cluster the allotted sound based on the location of the identified object, adjust characteristics of the extracted base sound, the assumed rear sound, and the clustered sound, and allot the sounds wherein the characteristics were adjusted to respective channels according to the audio sources and generate a surround sound.

According to an example embodiment, a controlling method of an electronic apparatus includes the steps of photographing an image, and receiving an input of a sound, and generating sounds of a plurality of channels based on the input sound. Also, the step of generating the sounds of a plurality of channels includes the steps of identifying an object and the location of the object from the photographed image, classifying the input sound based on an audio source, and allotting the sound to the corresponding identified object, copying the classified sound and generating sounds of two channels, adjusting characteristics of the generated sounds of two channels based on the audio source allotted to the identified object and the location of the identified object, and mixing the sounds of two channels wherein the characteristics were adjusted according to the audio source and generating a stereo sound of two channels.

Alternatively, a controlling method of an electronic apparatus includes the steps of photographing an image, and receiving an input of a sound, and generating sounds of a plurality of channels based on the input sound. Also, the step of generating the sounds of a plurality of channels includes the steps of identifying an object and the location of the object from the photographed image, classifying the input sound based on an audio source, and allotting the sound to the corresponding identified object, extracting a base sound based on the input sound, assuming a rear sound, and clustering the allotted sound based on the location of the identified object, adjusting characteristics of the extracted base sound, the assumed rear sound, and the clustered sound, and allotting the sounds wherein the characteristics were adjusted to respective channels according to the audio sources and generating a surround sound.

BRIEF DESCRIPTION OF THE DRAWINGS

The above and other aspects, features, and advantages of certain example embodiments of the present disclosure will be more apparent from the following detailed description, taken in conjunction with the accompanying drawings, in which:

FIG. 11 is a flow chart illustrating a process of generating a surround sound according to an example embodiment.

DETAILED DESCRIPTION

Figure 1:
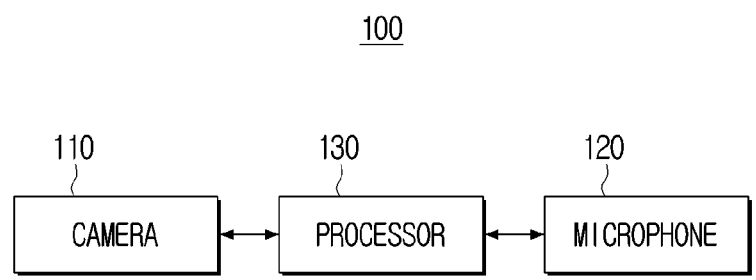
FIG. 1 is a block diagram illustrating a configuration of an electronic apparatus according to an example embodiment.

Hereinafter, various embodiments will be described in more detail with reference to the accompanying drawings. The embodiments described in this specification may be modified in various ways. Also, specific embodiments may be illustrated in the drawings, and described in detail in the detailed description. However, specific embodiments disclosed in the accompanying drawings are just for making the various embodiments easily understood. Accordingly, the technical idea of the disclosure is not restricted by the specific embodiments disclosed in the accompanying drawings, and the embodiments should be understood as including all equivalents or alternatives included in the idea and the technical scope of the disclosure.

Also, terms including ordinal numbers such as "first," "second" and the like may be used to describe various elements, but the aforementioned terms are not intended to limit the elements. The aforementioned terms are used only to distinguish one element from another element.

In addition, in this specification, terms such as "include" and "have" should be construed as designating that there are such characteristics, numbers, steps, operations, elements, components or a combination thereof described in the specification, but not as excluding in advance the existence or possibility of adding one or more of other characteristics, numbers, steps, operations, elements, components or a combination thereof. Also, the description in the disclosure that one element is "coupled" or "connected" to another element should be interpreted to include both the case where the one element is directly coupled or connected to the another element, and the case where the one element is coupled or connected to the another element through still another element(s). In contrast, the description that one element is "directly coupled" or "directly connected" to another element can be interpreted to mean that still another element does not exist between the one element and the another element.

Meanwhile, "a module" or "a part" for the elements used in this specification performs at least one function or operation. Also, "a module" or "a part" may perform a function or an operation by hardware, software, or a combination of hardware and software. In addition, a plurality of "modules" or a plurality of "parts" except "a module" or "a part" that needs to be implemented in specific hardware or is performed in at least one processor may be integrated into at least one module. Further, singular expressions include plural expressions, unless defined differently in the context. Each module herein may comprise circuitry.

Also, in the description of the disclosure, the order of each step should be understood in a nonrestrictive way, unless a preceding step should necessarily be performed prior to a subsequent step in a logical and temporal sense. That is, excluding an exceptional case as above, even if a process described as a subsequent step is performed prior to a process described as a preceding step, there would be no influence on the essence of the disclosure, and the scope of the disclosure should also be defined regardless of the orders of steps. Further, the description "A or B" in this specification is defined to include not only a case wherein one of A or B is selectively referred to, but also a case wherein both of A and B are included. In addition, the term "include" in this specification includes a case wherein elements other than elements listed as being included are further included.

In addition, in this specification, only essential elements necessary for describing the disclosure are described, and elements not related to the essence of the disclosure are not mentioned. Also, the descriptions of the disclosure should not be interpreted to have an exclusive meaning of including only the elements mentioned, but to have a non-exclusive meaning of also including other elements.

Further, in describing the disclosure, in case it is determined that detailed explanation of related known functions or features may unnecessarily confuse the gist of the disclosure, the detailed explanation will be abridged or omitted. Meanwhile, each example embodiment may be independently implemented or operated, but it may also be implemented or operated in combination with another embodiment.

FIG. 1 is a block diagram illustrating a configuration of an electronic apparatus according to an example embodiment.

Referring to FIG. 1, an electronic apparatus 100 includes a camera 110, a microphone 120, and a processor 130.

The camera 110 may capture (e.g., photograph) the surrounding environment of the electronic apparatus 100, and generate an image. For example, the image may include objects. Also, the image may include a still image and a moving image, etc. As an example, one camera 110 may be arranged on the rear surface of the electronic apparatus 100, or a plurality of different types of cameras performing different functions from one another may be arranged. Alternatively, one or more cameras 110 may be arranged on the front surface of the electronic apparatus 100. For example, the camera 110 may include a CCD sensor and a CMOS sensor. Also, the camera 110 may include an RGB camera, a depth camera, a wide angle camera, a telephoto camera, etc.

The microphone 120 receives an input of an external sound. For example, one microphone 120 may be arranged on the electronic apparatus 100, or a plurality of microphones 120 may be arranged. For example, the microphone 120 may include a general microphone, a surround microphone, a directional microphone, etc.

The processor 130 controls each component of the electronic apparatus 100. For example, the processor 130 controls the camera 110 to capture (e.g., photograph) an image, and controls the microphone 120 to receive an input of a sound. Also, the processor 130 generates sounds of a plurality of channels based on an input sound. For example, the processor 130 may receive an input of a mono sound, and generate a stereo sound. Alternatively, the processor 130 may receive an input of a mono sound or a stereo sound, and generate a surround sound. That is, sounds of a plurality of channels mean a stereophonic sound, and a stereophonic sound may include a stereo sound, a surround sound, etc.

The processor 130 identifies an object and the location of the object from a photographed image. Then, the processor 130 classifies the input sound based on an audio source, and allots the sound to a corresponding object. For example, a captured (e.g., photographed) image may be a moving image. Also, an object may include a person, a car, etc. In the disclosure, an object may be a subject that generates a sound. As an example, in case the electronic apparatus 100 photographs a singer as a moving image, the electronic apparatus 100 may photograph an image of the singer, and receive an input of a vocal sound sung by the singer. The processor 130 may identify the singer that is an object from the image, and identify the location of the singer within the image. Then, the processor 130 may separate the input sound into respective sounds. The processor 130 may classify audio sources corresponding to the separated sounds based on frequency characteristics, and identify the sounds. The processor 130 may identify an object and classify a sound based on an artificial intelligence model. An audio source may mean a type of a sound. For example, if the electronic apparatus 100 receives an input of a vocal sound of a singer together with a sound of a car noise and a sound of people's conversation, the processor 130 may separate the input sounds into individual sounds. The processor 130 may classify the sounds into a car noise sound, a conversation sound, and a vocal sound based on the audio sources.

The processor 130 may allot the classified sounds to corresponding objects. For example, the processor 130 may identify a singer, and identify a vocal sound. Then, the processor 130 may allot the vocal sound to the singer.

Meanwhile, in order for the electronic apparatus 100 to generate a stereo sound by using an input mono sound, sounds of two channels are needed. For generating a stereo sound based on an input mono sound, the processor 130 may copy the sound, and generate sounds of two channels. In a stereo sound, two channels may mean a left channel sound and a right channel sound. Also, in order for a user to feel the sense of a stereo sound, sounds of two channels should be output while having differences in the strength, the time, etc. Accordingly, the processor 130 may adjust characteristics of sounds of two channels based on an audio source and the location of an identified object. For example, the processor 130 may adjust sound panning to a predetermined location, time delay, phase delay, strength adjustment, amplitude adjustment, spectral modification, etc. of sounds of two channels. The processor 130 may mix the sounds of two channels wherein the characteristics were adjusted according to the audio source, and generate a stereo sound of two channels.

Also, the electronic apparatus 100 may generate a surround sound by using an input sound. As described above, the processor 130 identifies an object and the location of the object from a photographed image. Then, the processor 130 may classify the input sound based on an audio source, and allot the sound to a corresponding object. The processor 130 may extract a base sound from the input sound and assume a rear sound. Also, the processor 130 may cluster the allotted sound based on the location of the identified object. Clustering may mean dividing an image into specific areas, and classifying sounds generated in the same area as one group based on the locations of objects. For example, in case an image was divided into a left area, a center area, and a right area, the processor 130 may cluster sounds as left area sounds, center area sounds, and right area sounds based on the locations of objects.

The processor 130 may adjust characteristics of the extracted based sound, the assumed rear sound, and the clustered sound, and allot the sounds wherein the characteristics were adjusted to respective channels and generate a surround sound. The respective channels generating the surround sound may mean a 3.1 channel, a 5.1 channel, etc. An input sound for generating a surround sound may be a sound including a plurality of channels. In case an input sound is a mono sound, the processor 130 may include a process of copying a rear sound or a clustered sound, and generating a left sound and a right sound.

Figure 2:
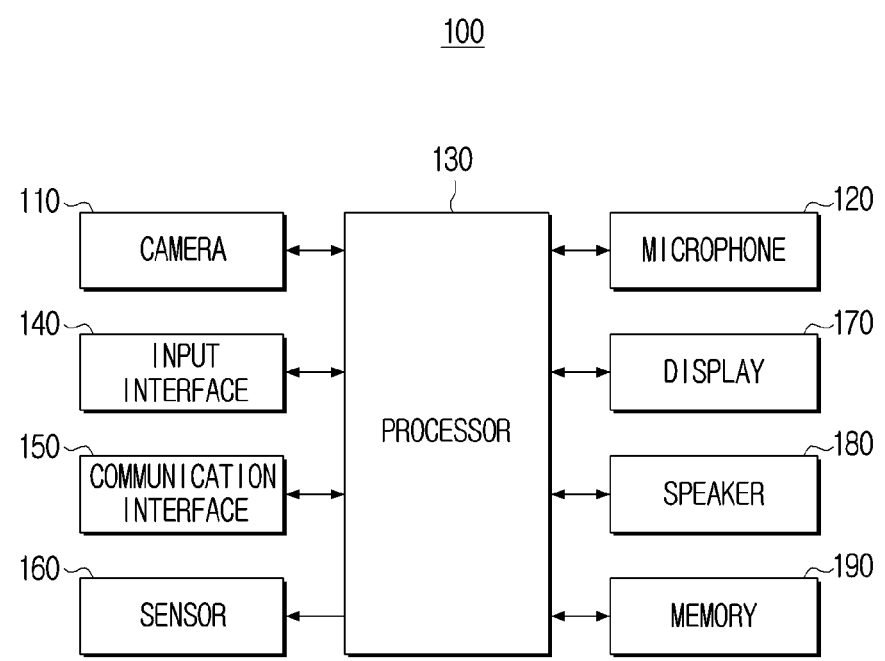
FIG. 2 is a block diagram illustrating a detailed configuration of an electronic apparatus according to an example embodiment.

FIG. 2 is a block diagram illustrating a detailed configuration of an electronic apparatus according to an example embodiment. Each embodiment herein may be used in combination with any other embodiment described herein.

Referring to FIG. 2, an electronic apparatus 100 may include a camera 110, a microphone 120, a processor 130, an input interface 140, a communication interface 150, a sensor 160, a display 170, a speaker 180, and a memory 190. As the camera 110 and the microphone 120 are the same as what is described in FIG. 1, detailed explanation in that regard will be omitted.

The input interface 140 may receive an input of a control command from a user. For example, the input interface 140 may include a key pad, a touch pad, a touch screen, etc. Alternatively, the input interface 140 may include an input/output port, and receive an input of data. For example, the input interface 140 may receive an input of a moving image including sounds and images. In case the input interface 140 includes an input/output port, the input/output port may include ports such as a High-Definition Multimedia Interface (HDMI), a Display Port (DP), an RGB, a Digital Visual Interface (DVI), a Universal Serial Bus (USB), Thunderbolt, a LAN, an AUX, etc. The input interface 140 may also be referred to as an input part, an input module comprising input circuitry, etc. In case the input interface 140 performs an input/output function, it may also be referred to as an input/output unit, an input/output module comprising circuitry, etc.

The communication interface 150 may perform communication with an external apparatus. For example, the communication interface 150 may perform communication with an external apparatus by at least one communication method among communication methods such as Wi-Fi, Wi-Fi Direct, Bluetooth, Zigbee, 3rd Generation (3G), 3rd Generation Partnership Project (3GPP), and Long-Term Evolution (LTE). The aforementioned communication interface 150 may also be referred to as a communication part, a communication module comprising communication circuitry, a transceiver, etc.

The sensor 160 may detect an object around the electronic apparatus 100. The processor 130, comprising processing circuitry, may recognize a control command based on a detected signal, and perform a control operation corresponding to the recognized control command. Also, the sensor 160 may detect the surrounding environment information of the electronic apparatus 100. The processor 130 may perform a corresponding control operation based on the surrounding environment information detected at the sensor 160. For example, the sensor 160 may include an acceleration sensor, a gravity sensor, a gyro sensor, a geomagnetic sensor, a direction sensor, a motion recognition sensor, a proximity sensor, a voltmeter, an amperemeter, a barometer, a hygrometer, a thermometer, an illumination sensor, a heat detection sensor, a touch sensor, an infrared sensor, an ultrasonic sensor, etc.

The display 170 may output data processed at the processor 130 as an image. The display 170 may display a photographed image, and display a mark indicating a separated sound in the form of a text or an image. For example, the display 170 may be implemented as a Liquid Crystal Display (LCD), Organic Light Emitting Diode (OLED), a flexible display, a touch screen, etc. In case the display 170 is implemented as a touch screen, the electronic apparatus 100 may receive an input of a control command through the touch screen.

The speaker 180 outputs a voice signal for which voice processing was performed. For example, a plurality of speakers 180 may be arranged on the electronic apparatus 100, and the processor 130 may allot sounds of the respective channels based on the locations of the arranged speakers 180, and output a stereophonic sound. Also, the speaker 180 may output information on a user's input command, information related to the state of the electronic apparatus 100, or information related to an operation, etc. as a voice or a notification sound.

The memory 190 may store data, algorithms, etc. that perform the functions of the electronic apparatus 100, and store programs, commands, etc. operated in the electronic apparatus 100. For example, the memory 190 may store an image processing artificial intelligence algorithm and a sound processing artificial intelligence algorithm. The processor 130 may identify an object from a photographed image by using the image processing artificial intelligence algorithm. Also, the processor 130 may process an input sound by using the sound processing artificial intelligence algorithm and generate a stereophonic sound. The algorithms stored in the memory 190 may be loaded on the processor 130 by control of the processor 130, and perform an object identification process or a sound processing process. For example, the memory 190 may be implemented in types such as a ROM, a RAM, an HDD, an SSD, a memory card, etc. Each "processor" herein comprises processing circuitry.

So far, the configuration of the electronic apparatus 100 was described. Hereinafter, a process of matching an object and a sound included in an image will be described.

Figure 3A:
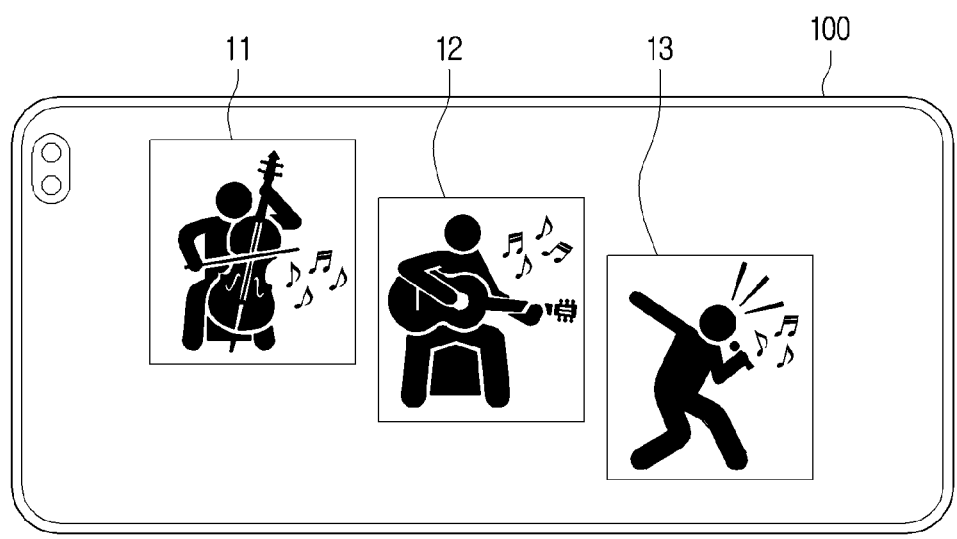
FIGS. 3A-3C are diagrams illustrating a process of matching an object and a sound according to an example embodiment.
Figure 3B:
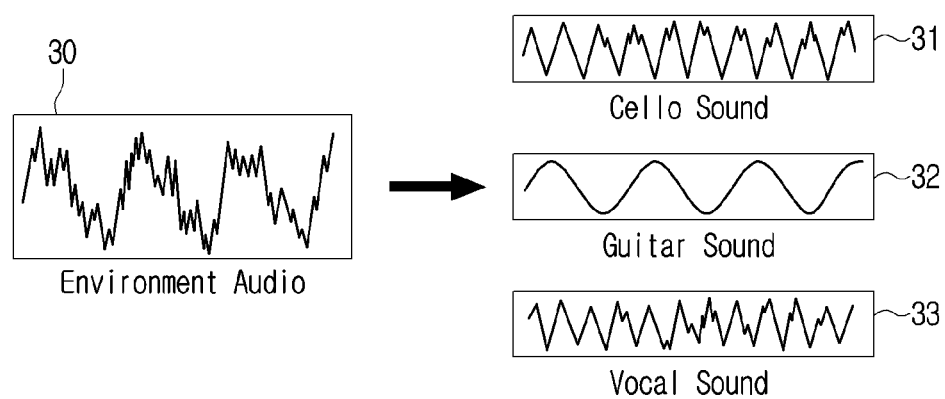
Figure 3C:
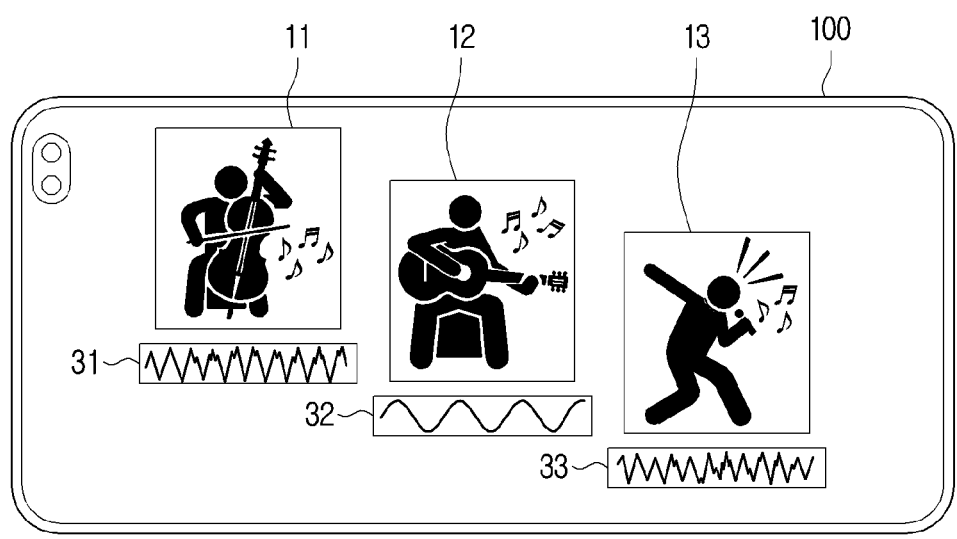

FIG. 3a to FIG. 3c are diagrams illustrating a process of matching an object and a sound according to an example embodiment.

Referring to FIG. 3a, an image that photographed a concert scene is illustrated.

The electronic apparatus 100 may photograph a concert scene as a moving image. As an example, an image may include a cello player 11, a guitar player 12, and a singer 13. The cello player 11, the guitar player 12, and the singer 13 may mean objects included in the image. The electronic apparatus 100 may identify the objects from the photographed image. For example, the electronic apparatus 100 may include an image processing artificial intelligence algorithm. The electronic apparatus 100 may identify the objects from the photographed image by using the image processing artificial intelligence algorithm.

Functions related to artificial intelligence according to the disclosure are operated through the processor and the memory. The processor may be made up of one or a plurality of processors. Here, the one or plurality of processors may be generic-purpose processors such as a CPU, an AP, a digital signal processor (DSP), etc., graphic-dedicated processors such as a GPU and a vision processing unit (VPU), or artificial intelligence-dedicated processors such as an NPU. The one or plurality of processors perform control to process input data according to predefined operation rules or an artificial intelligence model stored in the memory. Alternatively, in case the one or plurality of processors are artificial intelligence-dedicated processors, the artificial intelligence-dedicated processors may be designed as a hardware structure specified for processing of a specific artificial intelligence model.

The predefined operation rules or the artificial intelligence model are characterized in that they are made through learning. Here, being made through learning means that a basic artificial intelligence model is trained by using a plurality of learning data by a learning algorithm, and predefined operations rules or an artificial intelligence model set to perform desired characteristics (or, purposes) are thereby made. Such learning may be performed in an apparatus itself wherein artificial intelligence is performed according to the disclosure, or through a separate server and/or a system. As examples of learning algorithms, there are supervised learning, unsupervised learning, semi-supervised learning, or reinforcement learning, but learning algorithms in the disclosure are not limited to the aforementioned examples.

An artificial intelligence model may include a plurality of neural network layers. Each of the plurality of neural network layers has a plurality of weight values, and performs a neural network operation through the operation result of the previous layer and an operation among the plurality of weight values. The plurality of weight values included by the plurality of neural network layers may be optimized by the learning result of the artificial intelligence model. For example, the plurality of weight values may be updated such that a loss value or a cost value acquired at the artificial intelligence model during a learning process is reduced or minimized. An artificial neural network may include a deep neural network (DNN), and there are, for example, a convolutional neural network (CNN), a deep neural network (DNN), a recurrent neural network (RNN), a restricted Boltzmann Machine (RBM), a deep belief network (DBN), a bidirectional recurrent deep neural network (BRDNN), a You Only Look Once (YOLO), or deep Q-networks, etc., but the disclosure is not limited to the aforementioned examples.

As described above, the electronic apparatus 100 may identify the objects of the cello player 11, the guitar player 12, and the singer 13 from the photographed image by using the image processing artificial intelligence algorithm.

FIG. 3b illustrates a process of separating an input sound. The electronic apparatus 100 may photograph a concert, and receive an input of a mixed sound 30 in the surroundings. The input mixed sound 30 may include a cello sound 31, a guitar sound 32, and a vocal sound 33. For example, the electronic apparatus 100 may separate the respective sounds from the input sound by using the sound processing artificial intelligence algorithm. As an example, the sound processing artificial intelligence algorithm may include an Independent Component Analysis (ICA) model. The ICA model may decompose a multivariate signal into independent attached subordinate elements by a method using a cocktail effect. For example, the ICA model may decompose a mixed sound signal of the length of T seconds consisting of three sources into three sound signals of T seconds.

The electronic apparatus 100 may separate a mixed sound signal, and then classify audio sources corresponding to the respective sounds based on frequency characteristics and identify the sounds by using sound source information. The electronic apparatus 100 may classify and identify audio sources by using the sound processing artificial intelligence algorithm. As illustrated in FIG. 3b, first, the electronic apparatus 100 may separate the input mixed sound 30 into an a sound, a b sound, and a c sound. Then, the electronic apparatus 100 may classify and identify the separated a sound as the cello sound 31, the b sound as the guitar sound 32, and the c sound as the vocal sound 33. As an example, the electronic apparatus 100 may store sound source information, and identify separated sounds based on the stored sound source information. Alternatively, the electronic apparatus 100 may transmit separated sounds to an external apparatus including sound source information. The external apparatus may identify the audio sources, and transmit the identified sound source information to the electronic apparatus 100.

FIG. 3c illustrates a diagram wherein objects and sounds are matched.

As described above, the electronic apparatus 100 may identify objects. Then, the electronic apparatus 100 may separate the mixed sound, and identify the respective separated sounds. The electronic apparatus 100 may allot (or, match) the identified respective sounds to corresponding objects. For example, the electronic apparatus 100 may allot the cello sound 31 to the cello player object 11, allot the guitar sound 32 to the guitar player object 12, and allot the vocal sound 33 to the singer object 13. As an example, the electronic apparatus 100 may display identified objects and corresponding sounds. The electronic apparatus 100 may display a mark indicating a sound corresponding to an object together with the identified object.

Meanwhile, the electronic apparatus 100 may not identify separated sounds.

Figure 4A:
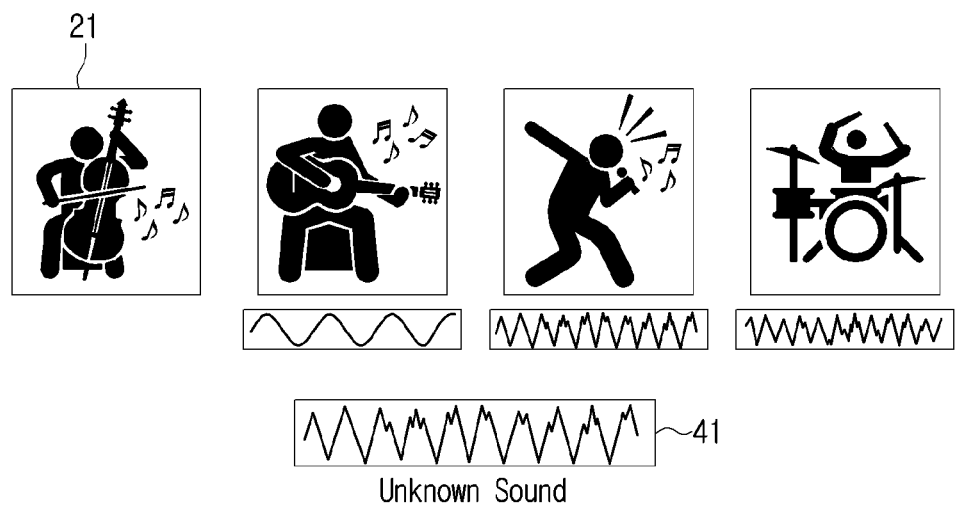
FIG. 4a to FIG. 4c are diagrams illustrating a process of matching an object and a sound manually according to an example embodiment.
Figure 4B:
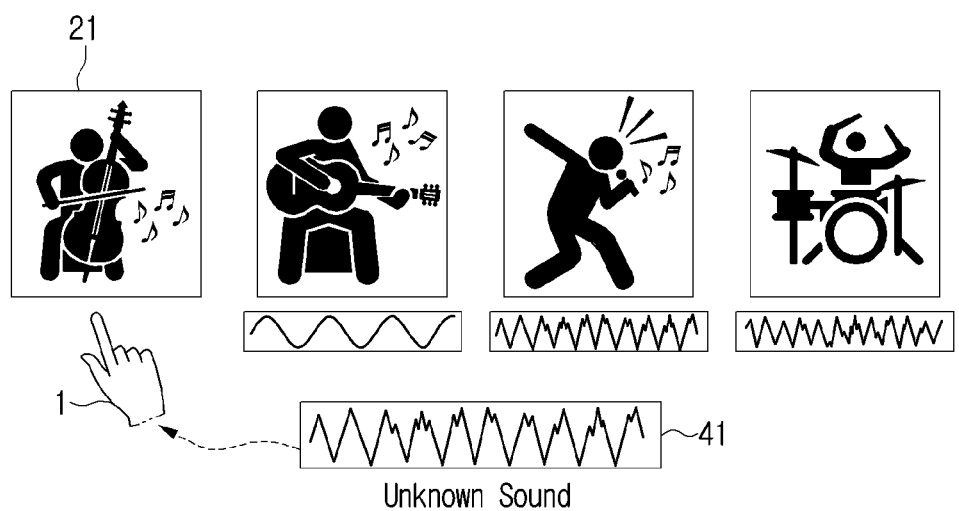
Figure 4C:
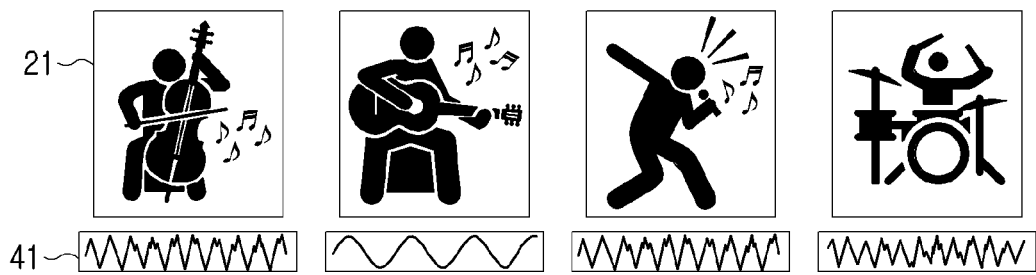

FIG. 4a to FIG. 4c are diagrams illustrating a process of matching an object and a sound manually according to an example embodiment.

Referring to FIG. 4a, a diagram wherein objects are identified and corresponding sounds are allotted to the objects is illustrated. For example, the electronic apparatus 100 may identify a cello player object 21 from a photographed image, and separate four sounds from an input mixed sound. However, the electronic apparatus 100 may not identify one separated sound 41. In case the electronic apparatus 100 fails to identify a separated sound, the electronic apparatus 100 may display a predetermined indicator on the classified sound. As an example, the predetermined indicator may be a text such as unknown sound. That is, in case the electronic apparatus 100 fails to identify an object corresponding to a classified sound, the electronic apparatus 100 may display the sound 41 on which the predetermined indicator is displayed together with the identified object.

Referring to FIG. 4b, a process of matching an object and a sound manually by a user is illustrated. The electronic apparatus 100 may receive an input of a command for moving the mark of the sound 41 on which the predetermined indicator is displayed from the user 1. For example, the command input from the user 1 may be a command by a drag-and-drop method, but is not limited thereto. According to the user's command, the electronic apparatus 100 may move the mark of the sound 41 on which the predetermined indicator is displayed to the cello player object 21 to which a sound is not allotted. The electronic apparatus 100 may allot the sound 41 on which the predetermined indicator is displayed to the cello player object 21 according to the user's command.

As illustrated in FIG. 4c, through the aforementioned process, the electronic apparatus 100 may match the sound 41 which was not identified to one object 21, and thereby match the identified objects and the classified sounds in 1:1.

Figure 5:
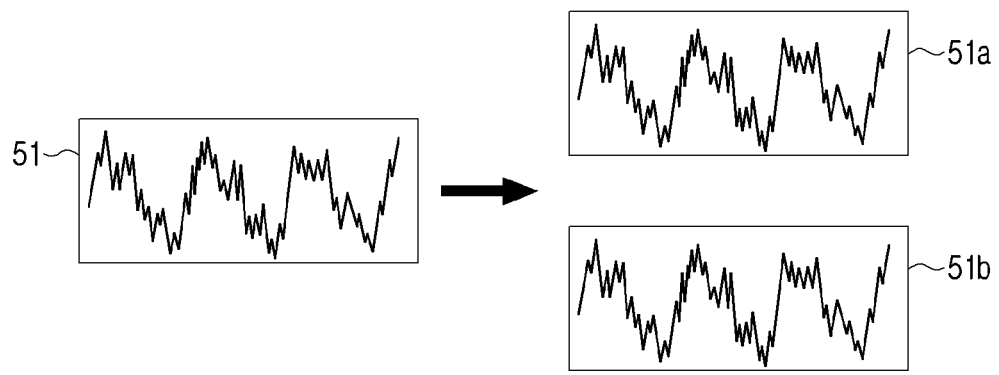
FIG. 5 and FIG. 6 are diagrams illustrating a process of generating a stereo sound according to an example embodiment.
Figure 6:
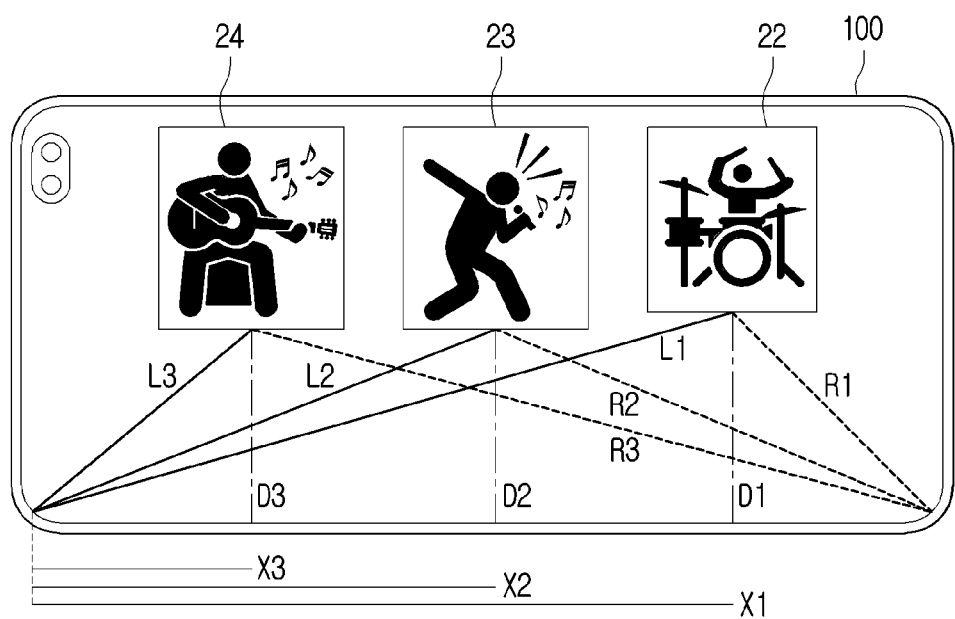

FIG. 5 and FIG. 6 are diagrams illustrating a process of generating a stereo sound according to an example embodiment.

Referring to FIG. 5, a process of copying an input sound 51 into a plurality of channels is illustrated. As described above, for generating a stereo sound, sounds of a plurality of channels (e.g., a left channel, a right channel) are needed. However, in case the electronic apparatus 100 includes one microphone, an input sound is a mono sound. Accordingly, for generating a stereo sound, the electronic apparatus 100 may copy the mono sound and generate sounds of two channels which are a sound for the left side 51a and a sound for the right side 51b. The electronic apparatus 100 may classify the respective individual sounds separated by the aforementioned method according to audio sources, and allot the sounds to identified objects. Then, the electronic apparatus 100 may copy the classified mono sound and generate sounds of two channels.

Referring to FIG. 6, an example of identifying locations of objects is illustrated. For generating a stereo sound, characteristics of sounds of the respective channels should be adjusted according to the distances to the identified objects. For example, the size of a sound corresponding to an object located to be close to a user should be big, and the size of a sound corresponding to an object located to be far from a user should be small. Also, the feeling of sound of a sound corresponding to an object located on the left side of a user should be formed in the left area of the user, and the feeling of sound of a sound corresponding to an object located on the right side of a user should be formed in the right area of the user.

For example, a location of an object may be acquired by using a triangular relation, a LiDar sensor, or a ToF sensor. In case the electronic apparatus 100 includes a sensor, the electronic apparatus 100 may acquire a location of an object based on a signal detected at the sensor. Alternatively, as illustrated in FIG. 6, the electronic apparatus 100 may identify a location of an object by using a triangular relation. For example, the electronic apparatus 100 may acquire distances D1, D2, and D3 to respective objects 22, 23, and 24. D1, D2, and D3 may be absolute distances, or they may be relative distances. Also, the electronic apparatus 100 may acquire separated distances X1, X2, and X3 of the respective objects 22, 23, and 24 from the left speaker. X1, X2, and X3 may be relative distances. The locations of the objects 22, 23, and 24 from the left speaker may be acquired by using the Pythagorean theorem. The locations of the objects 22, 23, and 24 from the right speaker may also be acquired by a similar method.

The electronic apparatus 100 may adjust the characteristics of the sounds of two channels allotted to the objects based on the acquired locations of the objects 22, 23, and 24. For example, the electronic apparatus 100 may adjust the characteristics of the sounds by methods such as sound panning to a predetermined location, time delay, phase delay, strength adjustment, amplitude adjustment, spectral modification, etc. As an example, an audio image of a sound corresponding to the guitar player object 24 may be formed in the left area by delaying the right channel, delaying the phase, or weaking the strength or the amplitude. Alternatively, the electronic apparatus 100 may form an audio image in the left area by adjusting the left channel in an opposite manner to the aforementioned manner of adjusting the characteristics of the right channel.

So far, a process wherein the electronic apparatus 100 generates a stereo sound by using an input mono sound was described. Hereinafter, a process of generating a surround sound will be described.

Figure 7A:
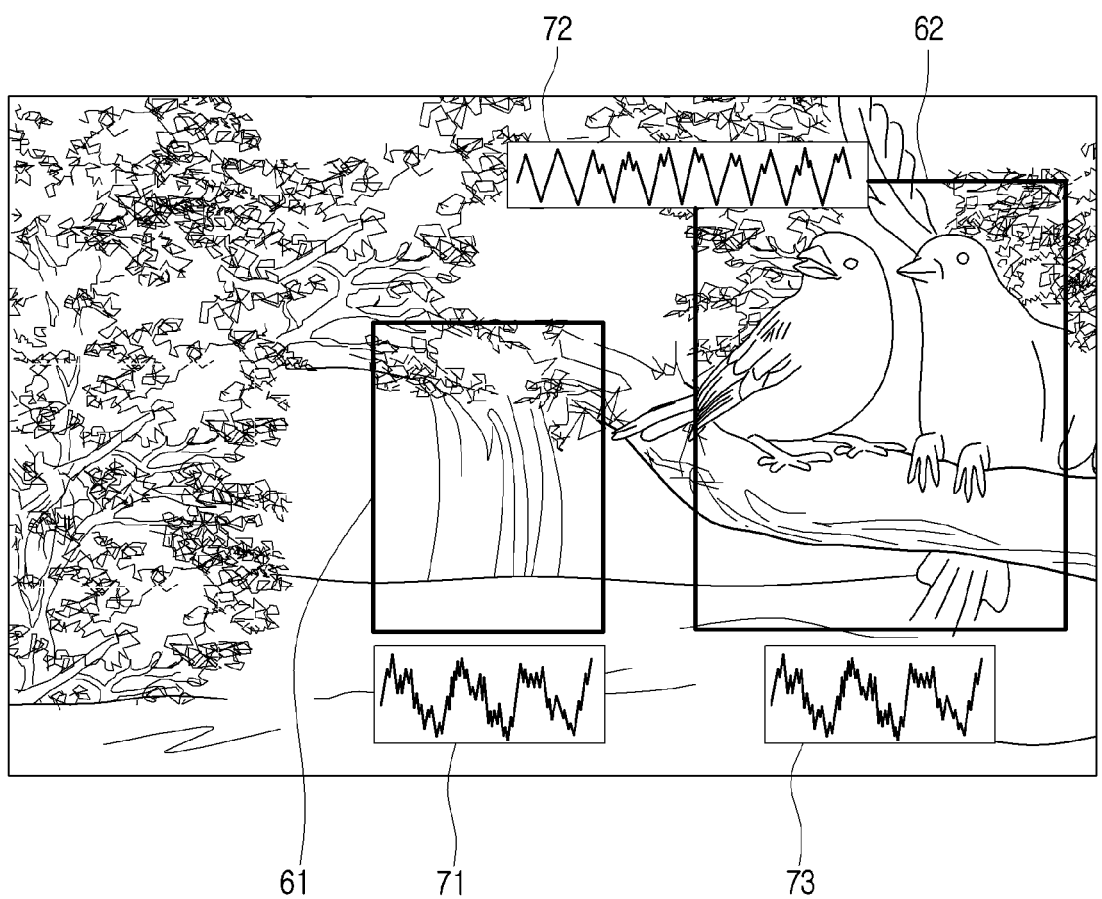
FIG. 7a and FIG. 7b are diagrams illustrating a process of clustering a sound according to an example embodiment.
Figure 7B:
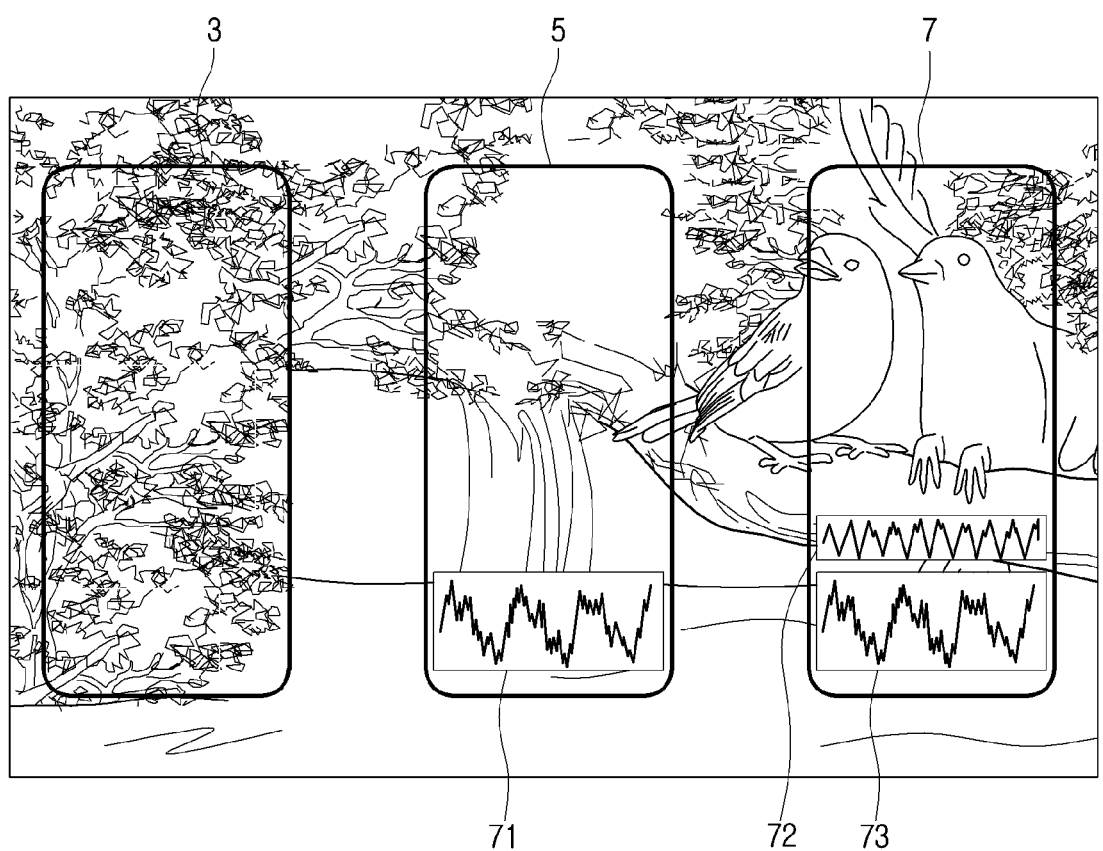

FIG. 7a and FIG. 7b are diagrams illustrating a process of clustering a sound according to an example embodiment.

Referring to FIG. 7a, the electronic apparatus 100 may photograph a moving image including a waterfall 61 and a bird 62, and receive an input of a mixed sound around the photographed place. For example, the mixed sound may include a waterfall sound 71, a bird sound 72, and an ambient noise sound 73, etc.

The electronic apparatus 100 may identify objects and the location of the objects from an image photographed in the same manner as the aforementioned method. Then, the electronic apparatus 100 may classify an input sound based on an audio source, and allot the sound to the corresponding identified object. As an example, as illustrated in FIG. 7a, the electronic apparatus 100 may identify the waterfall object 61 and the bird object 62, and allot the corresponding waterfall sound 71 to the identified waterfall object 61, and allot the corresponding bird sound 72 to the identified bird object 62. Then, for generating a surround channel, the electronic apparatus 100 may divide the image into predetermined areas, and cluster the sounds allotted to the objects included in the same area among the divided respective areas in the same group.

Referring to FIG. 7b, an example of clustering sounds for respective areas is illustrated. For example, if the electronic apparatus 100 generates a surround sound of three channels, the electronic apparatus 100 may divide sounds into a left channel, a center channel, and a right channel. Accordingly, the electronic apparatus 100 may divide an image into a left area 3, a center area 5, and a right area 7, and identify to which area among the respective areas the classified sounds belong. For example, the electronic apparatus 100 may identify that the waterfall sound 71 is included in the center area 5, and the bird sound 72 and the noise sound 73 are included in the right area 7. Accordingly, the electronic apparatus 100 may cluster the waterfall sound 71 in the group of the center area 5, and cluster the bird sound 72 and the noise sound 73 in the group of the right area 7. If the electronic apparatus 100 generates a surround sound of five channels, the electronic apparatus 100 may divide the image into more detailed areas, and include the classified sounds into the respective areas.

Meanwhile, if the electronic apparatus 100 generates a surround sound of a 3.1 channel and a 5.1 channel, the electronic apparatus 100 may extract a base sound. For example, the electronic apparatus 100 may perform low-pass filtering of an input mixed sound, and extract a base sound. A surround sound may include a sound generated to a rear object other than a sound generated from a front object photographed by a camera.

Figure 8:
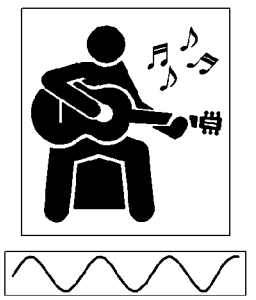
FIG. 8 is a diagram illustrating a process of matching a sound to a rear object according to an example embodiment.
Figure 8:
Figure 8:
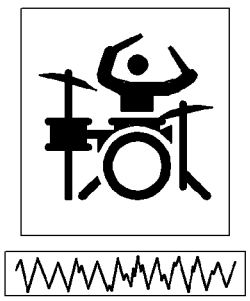
Figure 8:
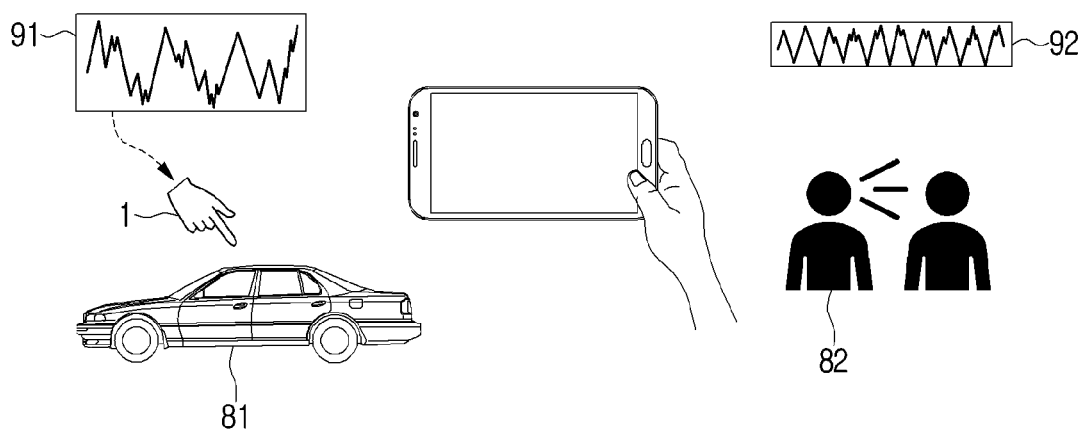

FIG. 8 is a diagram illustrating a process of matching a sound to a rear object according to an example embodiment.

Referring to FIG. 8, on the front side of the electronic apparatus 100, a guitar player object, a singer object, and a drum player object may be located, and on the rear side, a car object 81 and a talker object 82 may be located. In case the electronic apparatus 100 includes a surround camera, an object located on the rear side may also be photographed, and thus the electronic apparatus 100 may identify an object located on the rear side, and match a classified sound. Alternatively, in case the electronic apparatus 100 includes a camera arranged on the front surface and a camera arranged on the rear surface, an object located on the rear side may also be photographed by using the camera arranged on the rear surface, and thus the electronic apparatus 100 may identify an object located on the rear side, and match a classified sound.

However, in case the electronic apparatus 100 includes only a camera arranged on the front surface, the electronic apparatus 100 may not photograph the car object 81 and the talker object 82 located on the rear side. However, in a mixed sound input into the electronic apparatus 100, a car sound 91 and a conversation sound 92 may be included. Accordingly, the electronic apparatus 100 may assume sounds other than the sounds allotted to the identified objects in the image as rear sounds.

Alternatively, the electronic apparatus 100 may assume a rear sound manually by a user. For example, the electronic apparatus 100 may separate an a sound and a b sound from an input mixed sound. Then, the electronic apparatus 100 may identify the separated sounds based on frequency characteristics and sound source information. However, the electronic apparatus 100 cannot find out an object corresponding to an identified sound, and thus the electronic apparatus 100 may display a predetermined indicator on an identified sound. As an example, the electronic apparatus 100 may display an indicator such as unknown car sound on the car sound 91, and display an indicator such as unknown conversation sound on the conversation sound 92. The electronic apparatus 100 may receive an input of a command for moving the mark of the car sound 91 on which the indicator is displayed from the user 1. The electronic apparatus 100 may move the mark of the car sound 91 on which the predetermined indicator is displayed to a predetermined area of the screen according to the user's command. When the mark of the car sound 91 is moved to the predetermined area, the electronic apparatus 100 may assume the sound as a sound corresponding to an object located on the rear side. As an example, if the mark of the car sound 91 is moved to a predetermined left area, the electronic apparatus 100 may assume the sound as a sound corresponding to an object located on the left rear side, and if the mark of the conversation sound 92 is moved to a predetermined right area, the electronic apparatus 100 may assume the sound as a sound corresponding to an object located on the right rear side.

The electronic apparatus 100 may adjust the characteristics of the extracted base sound, the assumed rear sound, and the clustered sound and allot the sounds to the respective channels, and generate a surround sound. The process of adjusting the sound characteristics for generating a surround sound may be identical to the process of adjusting the sound characteristics for generating a stereo sound.

So far, various embodiments wherein an electronic apparatus generates a stereophonic sound were described. Hereinafter, a controlling method of an electronic apparatus will be described.

Figure 9:
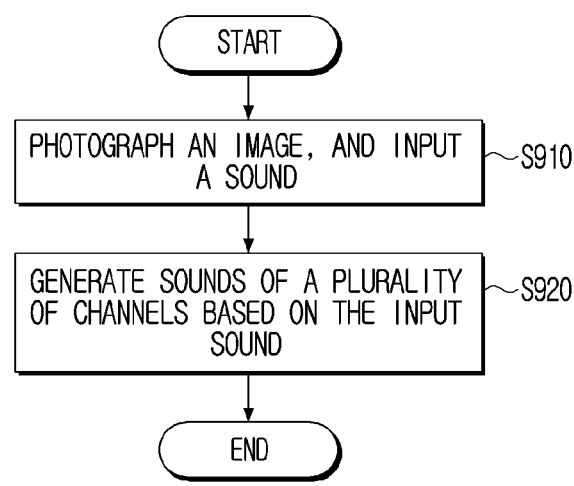
FIG. 9 is a flow chart illustrating a controlling method of an electronic apparatus according to an example embodiment.
Figure 10:
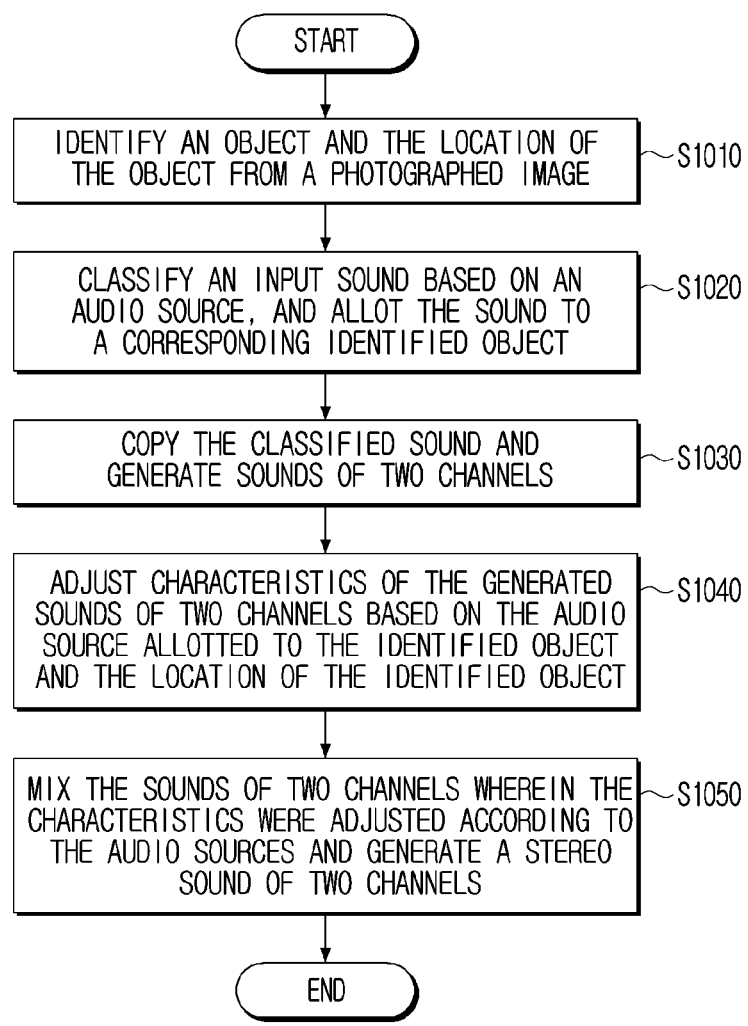
FIG. 10 is a flow chart illustrating a process of generating a stereo sound according to an example embodiment.

FIG. 9 is a flow chart illustrating a controlling method of an electronic apparatus according to an example embodiment, FIG. 10 is a flow chart illustrating a process of generating a stereo sound according to an example embodiment, and FIG. 11 is a flow chart illustrating a process of generating a surround sound according to an example embodiment. Hereinafter, explanation will be made with reference to FIG. 9 to FIG. 11 together.

An electronic apparatus photographs an image and receives an input of a sound in operation S910, and generates sounds of a plurality of channels based on the input sound in operation S920. For example, the electronic apparatus may receive an input of a mono sound of one channel, and generate a stereo sound (e.g., see FIG. 9).

Referring to FIG. 10, the electronic apparatus may identify an object and the location of the object from the photographed image in operation S1010. The electronic apparatus may identify an object and the location of the object based on an image processing artificial intelligence model.

The electronic apparatus (e.g., via at least the processor) may classify an input sound based on an audio source, and allot the sound to a corresponding identified object in operation S1020. For example, the electronic apparatus may receive an input of a mixed sound wherein various sounds are mixed. The electronic apparatus may separate the input sound into respective sounds. The electronic apparatus may identify audio sources corresponding to the separated respective sounds based on frequency characteristics. The electronic apparatus may classify the respective sounds based on the identified audio sources.

Meanwhile, in case the electronic apparatus fails to identify an object corresponding to a classified sound, the electronic apparatus may (e.g., via at least the processor) display a mark of the classified sound on which a predetermined indicator is displayed together with the identified object. The electronic apparatus may match the classified sound on which the predetermined indicator is displayed to the identified object according to a user's command input.

The electronic apparatus (e.g., via at least the processor) may copy the classified sound and generate sounds of two channels in operation S1030. For example, the sounds of two channels may be a sound of a left channel and a sound of a right channel. The electronic apparatus may adjust characteristics of the generated sounds of two channels based on the audio source allotted to the identified object and the location of the identified object in operation S1040. For example, the electronic apparatus may adjust the characteristics of the sounds of two channels by applying methods such as sound panning to a predetermined location, time delay, phase delay, strength adjustment, amplitude adjustment, spectral modification, etc. The electronic apparatus may adjust the characteristics of the sounds of two channels based on a sound processing artificial intelligence model.

The electronic apparatus (e.g., via at least the processor) may mix the sounds of two channels wherein the characteristics were adjusted according to the audio source and generate a stereo sound of two channels in operation S1050. The generated stereo sound of two channels may be stored in the memory, and output to the speaker. Alternatively, the electronic apparatus may transmit the generated stereo sound of two channels to an external apparatus together with an image.

Alternatively, the electronic apparatus may receive an input of a mono sound of one channel or a stereo sound, and generate a surround sound.

Referring to FIG. 11, the electronic apparatus may identify an object and the location of the object from a photographed image in operation S1110. Then, the electronic apparatus may classify an input sound based on an audio source, and allot the sound to a corresponding identified object in operation S1120. As the process of identifying an object and the process of classifying a sound and allotting the sound to a corresponding object are identical to the aforementioned processes, detailed explanation in that regard will be omitted.

The electronic apparatus (e.g., via at least the processor) may extract a base sound based on the input sound, and assume a rear sound in operation S1130. For example, the electronic apparatus may perform low-pass filtering of the input sound and extract a base sound. Then, the electronic apparatus may assume a sound other than the sounds allotted to the identified objects in the image as a rear sound. Alternatively, the electronic apparatus 100 may display an indicator on a separated sound that is not matched to an object. When the sound on which the indicator is displayed moves to a predetermined area on the screen according to a user's command, the electronic apparatus may assume the separated sound that is not matched to an object as a rear sound.

The electronic apparatus (e.g., via at least the processor) may cluster the allotted sounds based on the locations of the identified objects in operation S1140. For example, the electronic apparatus may divide the image into a plurality of areas based on the number of channels of a surround sound to be generated. Then, the electronic apparatus may cluster sounds allotted to objects included in the same area among the respective divided areas in the same group. "Based on" as used herein includes based at least on.

The electronic apparatus (e.g., via at least the processor) may adjust characteristics of the extracted base sound, the assumed rear sound, and the clustered sound in operation 1150. For example, the electronic apparatus may adjust the characteristics of the sounds of the respective channels by applying methods such as sound panning to a predetermined location, time delay, phase delay, strength adjustment, amplitude adjustment, spectral modification, etc. The electronic apparatus may adjust the characteristics of the sounds of the respective channels based on a sound processing artificial intelligence model.

The electronic apparatus (e.g., via at least the processor) may allot the sounds wherein the characteristics were adjusted according to the audio sources to the respective channels and generate a surround sound in operation S1160. The electronic apparatus may store or output the generated surround sound, or transmit the sound to an external apparatus.

The controlling method of an electronic apparatus according to the aforementioned various embodiments may be provided as a computer program product. The computer program product may include an S/W program itself or a non-transitory computer readable medium wherein an S/W program is stored.

A non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disk, a blue-ray disk, a USB, a memory card, a ROM and the like.

Also, while preferred embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Further, it is intended that such modifications are not to be interpreted independently from the technical idea or prospect of the disclosure.

What is claimed is:

1. An electronic apparatus comprising:
a camera configured to capture an image;
a display:
an input interface comprising circuitry;
a microphone configured to receive an input of a sound of a first channel;
a Time of Flight (ToF) sensor; and
a processor, comprising processing circuitry, configured to cause generation of sounds of a plurality of channels based on the input sound and to:
identify an object and the location of the object from the image by the ToF sensor,
classify the input sound based on an audio source, and allot the classified sound to the corresponding identified object,
copy the classified sound and control to generate sounds of at least two channels,
control to adjust characteristics of the generated sounds of at least two channels based on the audio source allotted to the identified object and the location of the identified object using at least one of sound panning to a predetermined location, time delay, phase delay, strength adjustment, amplitude adjustment and spectral modification, the location of the identified object being sensed by the ToF sensor,
control to mix the sounds of at least two channels wherein the characteristics were adjusted according to the audio source and generate a stereo sound of at least two channels,
based on failing to identify an object corresponding to the classified sound, control the display to display a predetermined indicator and the identified object on the classified sound, and
match the classified sound on which the predetermined indicator is displayed to the identified object based on a user's command input through the input interface.

2. The electronic apparatus of claim 1,
wherein the processor is configured to:
separate the input sound into respective sounds, identify audio sources corresponding to the respective separated sounds based on frequency characteristics, and classify the respective sounds based on the identified audio sources.

3. The electronic apparatus of claim 1,
wherein the processor is configured to:
identify the object and the location of the object based on an image processing artificial intelligence model, and adjust the characteristics of the generated sounds of two channels based on a sound processing artificial intelligence model.

4. An electronic apparatus comprising:
a camera configured to capture an image;
a display:
an input interface comprising circuitry:
a microphone configured to receive an input of a sound;
a Time of Flight (ToF) sensor and
a processor, comprising processing circuitry, configured to cause generation of sounds of a plurality of channels based on the input sound and to:
identify an object and the location of the object from the image,
classify the input sound based on an audio source, and allot the sound to the corresponding identified object,
extract a base sound based on the input sound, assume a rear sound, and cluster the allotted sound based on the location of the identified object,
control to adjust characteristics of the extracted base sound, the assumed rear sound, and the clustered sound using at least one of sound panning to a predetermined location, time delay, phase delay, strength adjustment, amplitude adjustment and spectral modification, the location of the identified object being sensed by the ToF sensor,
allot the sounds wherein the characteristics were adjusted to respective channels according to the audio sources and generate a surround sound,
based on failing to identify an object corresponding to the classified sound, control the display to display a predetermined indicator and the identified object on the classified sound, and
match the classified sound on which the predetermined indicator is displayed to the identified object based on a user's command input through the input interface.

5. The electronic apparatus of claim 4,
wherein the processor is configured to:
assume a sound other than the sound allotted to the identified object in the image among the input sound as the rear sound.

6. The electronic apparatus of claim 4,
wherein the processor is configured to:
divide the image into predetermined areas, and cluster sounds allotted to objects included in the same area among the respective divided areas in the same group.

7. The electronic apparatus of claim 4,
wherein the processor is configured to:
perform low-pass filtering of the input sound and extract the base sound.

8. A controlling method of an electronic apparatus, the method comprising:
capturing an image, and receiving an input of a sound; and
generating sounds of a plurality of channels based on the input sound,
wherein the generating the sounds of a plurality of channels comprises:
identifying an object and the location of the object from the image by ToF sensor of the electronic apparatus;
classifying the input sound based on an audio source, and allotting the classified sound to the corresponding identified object;
copying the classified sound and generating sounds of at least two channels;
adjusting characteristics of the generated sounds of at least two channels based on the audio source allotted to the identified object and the location of the identified object by method(s) using at least one of sound panning to a predetermined location, time delay, phase delay, strength adjustment, amplitude adjustment and spectral modification, the location of the identified object being sensed by the ToF sensor; and
mixing the sounds of at least two channels wherein the characteristics were adjusted according to the audio source and generating a stereo sound of at least two channels,
wherein the generating the sounds of a plurality of channels comprises:
based on failing to identify an object corresponding to the classified sound, displaying a predetermined indicator and the identified object on the classified sound, and matching the sound on which the predetermined indicator is displayed to the identified object according to a user's command input.

9. The controlling method of an electronic apparatus of claim 8,
wherein the generating the sounds of a plurality of channels comprises:
separating the input sound into respective sounds, identifying audio sources corresponding to the respective separated sounds based on frequency characteristics, and classifying the respective sounds based on the identified audio sources.

* * * * *